United States Patent [19]
Decker

[11] 3,997,815
[45] Dec. 14, 1976

[54] STUDIO LIGHTING SYSTEM

[75] Inventor: Hans-Heino Decker, Vechelde, Germany

[73] Assignee: Rollei-Werke Franke & Heidecke, Braunschweig, Germany

[22] Filed: May 29, 1975

[21] Appl. No.: 581,974

[30] Foreign Application Priority Data

June 6, 1974  Germany .......................... 2427254

[52] U.S. Cl. ........................... 315/241 P; 315/188; 315/360; 354/128
[51] Int. Cl.² .................................... H05B 41/32
[58] Field of Search ............... 315/241 P, 179, 188, 315/360; 354/127, 128, 145, 147, 290

[56] References Cited
UNITED STATES PATENTS

| | | | |
|---|---|---|---|
| 3,682,056 | 8/1972 | Tokutomi | 315/241 P X |
| 3,754,162 | 8/1973 | Katayama | 315/241 P |
| 3,780,344 | 12/1973 | Paget | 315/241 P |

Primary Examiner—Eugene LaRoche
Attorney, Agent, or Firm—Stonebraker, Shepard & Stephens

[57] ABSTRACT

A photographic lighting system, particularly for use in photographic studios, including a constant light for illuminating the subject to be photographed while the subject is being placed in proper position and while the photographer is focusing the camera, plus an electronic flash device for illuminating the subject while the actual photograph is being taken. The constant or continuous light is adjustable to vary the degree of illumination produced thereby, and the duration of the electronic flash is automatically adjusted to vary the duration of the flash, in response to the adjustment of the brilliance of the continuous light. The electronic flash tube is powered by a storage capacitor, and charge control means determines the voltage to which the storage capacitor is charged in preparation for an ensuing flash. Blocking means prevents the initiation of a flash unless the storage capacitor is charged to the proper voltage.

13 Claims, 4 Drawing Figures

STUDIO LIGHTING SYSTEM

BACKGROUND OF THE INVENTION

It is known in the art to provide lighting equipment for photographic studios, with a constant or continuous light illuminating the subject well enough for the photographer to place the subject in a desirable position and to focus the camera, and a supplementary flash light to provide the illumination necessary for taking the photograph. It is desirable to make the continuous or constant light adjustable to various degrees of brightness, and to vary the amount of light given off by the flash device, in accordance with the adjusted value of the continuous light.

In known constructions of this kind, a voltage divider is connected with the means for adjusting the brightness of the continuous light, so that the storage capacitor of the flash unit is charged up to a voltage of given value, corresponding to the brightness or intensity to which the continuous light is set. In this way, the amount of energy stored in the flash capacitor is so determined that upon discharge of the capacitor through the flash tube, the light radiated by the flash tube produces an illumination of the object to be photographed which as a whole provides for an exposure of the object being photographed corresponding to the distribution of light upon the illumination of the object by the continuous light.

If it is desired, after setting the continuous light to a given value of illumination, to reduce the brightness of the illumination, then an additional discharge circuit must be provided (in these devices of the prior art) so that the flash capacitor which was previously charged to a higher voltage upon the initial higher setting of the continuous light, can be discharged to a lower voltage value, before making the flash exposure. In addition to this, upon varying the continuous or focusing light, a given waiting time must always be allowed, so that the storage capacitor can charge or discharge, as the case may be, to the proper voltage value corresponding to the value of illumination of the continuous light.

An object of the present invention is to simplify and improve the prior art constructions of this same general type, by eliminating the need for varying the charge on the storage capacitor when the brightness of the continuous light is varied, and eliminating the need for allowing a waiting time after the continuous light is adjusted to a new value, before the flash is available for use. At the same time, it is an object of the invention also to do away with the previously required discharge circuit for partial discharge of the storage capacitor in order to decrease the voltage thereof, when the light output of the continuous light is adjusted to a lower value.

SUMMARY OF THE INVENTION

In order to achieve the above mentioned object, the present invention provides an electronic switch which can interrupt the flash discharge, and a control switch which can be activated upon the lighting of the flash tube, are provided to actuate the switch after a period of time which corresponds to the intensity of the continuous light. In this way, the invention obtains the result that the flash tube is always turned off when it has radiated a quantity of light proportional to the intensity of the continuous light.

A studio lighting system developed in this manner has a further advantage over the known studio lighting systems described above. In the known lighting systems of the kind described above, the shortest exposure time which can be obtained is about 1/100th of a second. This is due to the fact that for a given internal resistance of the customary flash tube, the discharge time of the storage capacitor or the burning period of the flash tube is about 1/100th of a second, and the camera shutter must be kept open for at least this long, since the quantity of light which can be given off by the flash tube is previously set with the continuous light. In order to photograph moving objects, these exposure times are too long for a sharp focusing of the moving object on the photograph. In order to obtain a shorter exposure time, the standard flash tubes are in such cases replaced by socalled short-time tubes which are characterized by a substantially lower internal resistance. By the modifying of the known studio lighting systems in accordance with the present invention, however, such a replacement of the flash tubes and a separate supply of so-called short-time tubes is unnecessary, since the discharge of the storage capacitor commences at a maximum operating voltage, and is merely interrupted earlier or later corresponding to the quantity of light desired. For this reason, even with relatively poor illumination of the object being photographed it is possible with this invention to make very short exposure times suitable for photographing a moving object, and to use the same flash tubes as under other photographic conditions, without having to replace them with special short-time flash tubes.

In accordance with a further development of the invention, the electronic switch is developed as a thyristor which is connected in series with the flash tube and is turned on concomitantly with the firing of the flash tube. Also a device is provided for extinguishing this thyristor (that is, rendering it non-conductive) which device can be placed in operation by the control circuit. In this way a high flash repetition rate is obtained, since the flash capacitor is only partially discharged upon each flash, and when the illumination of the object to be photographed has once been set, several photographs can be taken in rapid succession at the same setting.

The invention can be reduced to practice in a particularly simple manner, by employing a control circuit having a time function element which can be connected through a second electronic switch to drive a pulse generator whose output is connected with the extinguishing device of the switch thyristor. This time setting means for the variable time function element of the control circuit is coupled with the regulator for setting the continuous light, so that with suitable calibration, the disconnect time of the flash current is determined by the adjustment of the continuous light.

In the case of a time function member consisting of a series circuit of a capacitor and a variable resistor, it is advisable to connect the displaceable resistor tap mechanically with the wiper of a potentiometer which serves for adjusting the intensity of the continuous light.

In order to obtain an extremely exact proportioning of the quantity of light radiated by the flash tube, it is of great importance in a flash unit whose flash tube is fed by a flash capacitor, that the flash capacitor be at all times charged to exactly the same desired value of capacitor voltage at the time that the flash tube is fired. For this purpose, in accordance with a further development of the invention, there is provided a device for interrupting the charging of the capacitor, when the capacitor charge has reached a predetermined desired voltage, as well as a device for blocking the firing of the flash tube, when the capacitor voltage is below this desired value. Thus the tube can only be flashed when the capacitor charge is at the predetermined desired voltage.

In this connection, the first device advantageously contains a voltage transformer for charging the flash capacitor, which has a triac whose control electrode is connected to the output of an operational amplifier connected as comparator, whose one input is connected with the positive plate of the flash capacitor, and whose other input is connected with a reference voltage which determines the desired value of the charge of the flash capacitor. A second device for blocking the flash is established in the manner that the control electrode of a thyristor which triggers the firing device of the flash tube is connected via the conventional synchronous contact in the camera, to the output of an operational amplifier connected as a comparator. One input of this operational amplifier is connected with the positive plate of the flash capacitor, and the other input is connected with a reference voltage which determines the desired value of the flash capacitor.

DESCRIPTION OF THE PREFERRED EMBODIMENT

Figure 1:
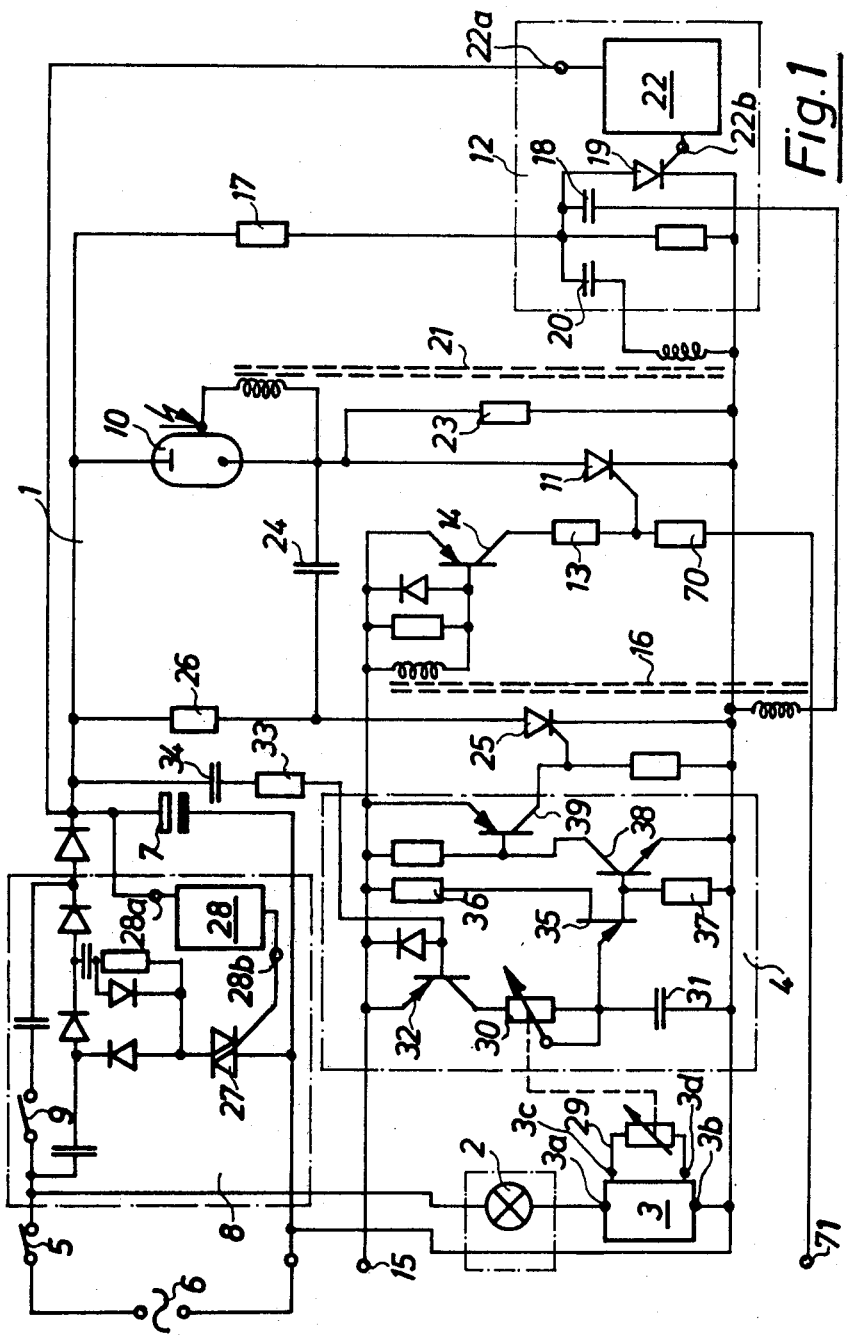
FIG. 1 is a schematic wiring diagram of a studio lighting system in accordance with a preferred embodiment of the invention.
Figure 4:
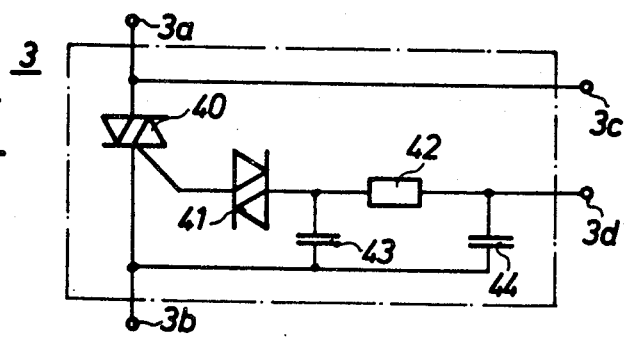
FIG. 4 is a wiring diagram illustrating further details of the phase control device indicated by the rectangle 3 in FIG. 1.

Referring first to FIG. 1, the studio lighting system comprises a flash unit indicated in general at 1, and a focusing continuous light source or lamp 2, the illumination from which may be varied by means of a phase control indicated schematically by the rectangle 3, further details of which will be described below in connection with FIG. 4. There is also a control circuit comprising the parts within the broken line rectangle 4, which determines the time for disconnecting the flash light, that is, for terminating the flash from the flash bulb or tube, and according to the invention the time for terminating the flash is adjustable in accordance with the adjusted brilliance of the continuous light from the continuous lamp 2. The focusing continuous light and the flash unit are connected through a switch 5 to a suitable alternating current power source 6, such as conventional power mains of 220 volts.

The flash unit comprises a flash capacitor or storage capacitor 7 which can be charged through a voltage transformer indicated in general by the broken line rectangle 8, to a suitable operating voltage of, for instance, 360 volts of direct current. The voltage transformer is developed as an ordinary conventional voltage doubler circuit fed from a 220 volt alternating current power line, and may be transformed into a voltage tripler circuit by closing the switch 9, so that when this switch is closed, the transformer can be fed from a 120 volt alternating current supply, and yet will be able to produce the desired output voltage of, for example, 360 volts.

The storage capacitor 7 can be discharged over a flash tube 10 which, together with a switch thyristor 11, is connected in parallel to the storage capacitor. The flash tube 10 can be fired by means of its firing electrode, when activated by a firing device indicated in general by the broken line rectangle 12, which device at the same time fires the switch thyristor 11, that is, triggers this thyristor so that it becomes conductive. For this purpose, the control electrode of the switch thyristor 11 is connected through a resistor 13 to the collector of a PNP transistor 14, the emitter of which is connected to a reference voltage source 15 of, for example, 10 volts direct current. The base of this transistor 14 is connected to the same reference voltage 15 through the secondary winding of a pulse transformer 16, thus being connected through this secondary winding to the emitter of the same transistor.

The primary winding of the pulse transformer 16 is connected at one end to the zero or negative terminal of the storage capacitor 7, and at its other end is connected to a capacitor 18 which forms part of the firing device 12. This capacitor 18 can be charged from the storage capacitor 7 through a resistor 17. A thyristor 19 in the firing device 12 is connected in parallel with the series circuit consisting of the capacitor 18 and the primary winding of the pulse transformer 16. Also in parallel with this thyristor 19 there is another series connection consisting of a capacitor 20 and primary winding of another pulse transformer 21. The capacitor 20, like the capacitor 18, can be charged from the main storage capacitor 7 through the resistor 17. The secondary winding of this second pulse transformer 21 is connected with the firing electrode of the flash tube 10, and also with the cathode of the flash tube, and the cathode of the flash tube is connected, as already indicated, to the anode of the switch thyristor 11. The cathode of the above mentioned thyristor 19 in the firing device 12 is connected with the cathode of the switch thyristor 11, and thus connected also with the negative plate of the storage capacitor 7. The control electrode of the thyristor 19 is connected with a blocking device 22 for preventing the firing of the flash tube whenever the voltage of the charge on the main storage capacitor 7 is below a given predetermined or desired value. This blocking device is indicated schematically in FIG. 1 by the rectangle 22, and further details of the blocking device will be described below in connection with FIG. 3.

A resistor 23 is connected in parallel with the anode-cathode path of the switch thyristor 11. Likewise a series connection comprising the quenching capacitor 24 and the anode-cathode path of the quenching thyristor 25 is also in parallel with the anode-cathode path of the switch thyristor 11. The connection between the quenching capacitor 24 and the anode of the quenching thyristor 25 is connected through a resistor 26 with the positive terminal of the main storage capacitor 7. The control grid or gate of the quenching thyristor 25 is connected to the control circuit 4, as will be further described below.

To make sure that the storage capacitor 7 is always charged to the desired constant or predetermined voltage when the flash unit is ready for flashing, the voltage transformer 8 is provided with a charge control switch 28 which disconnects the transformer as soon as the predetermined voltage value of the capacitor 7 has been reached, during the charging process. For this purpose, there is provided in the voltage transformer 8 a triac 27 which is conductive as long as the voltage of the storage capacitor lies below the predetermined voltage, and which blocks as soon as the predetermined voltage value of the storage capacitor has been reached. Upon the blocking of the triac 27, the voltage transformer is effectively disconnected; that is, no further charging current is supplied to the storage capacitor 7. The triac is controlled by the charge control circuit or switch 28 which compares the voltage of the storage capacitor 7 with a reference voltage and supplies the triac with firing pulses as long as the desired voltage of the storage capacitor has not been reached. This charge control switch 28 is schematically shown as a rectangle in FIG. 1, and further details thereof will be described below in connection with FIG. 2.

The phase control 3, which may be of a known kind, has an adjusting resistor 29 by means of which the brightness of the focusing light 2 is continuously adjustable. The wiper of the resistor 29 is mechanically connected with the movable tap or wiper of a variable resistor 30, so that a change in the setting of the resistor 29 causes a corresponding change in the resistance of the resistor 30. The variable resistor 30 together with a capacitor 31 form a time function element or member, one end of which member is connected to the negative terminal of the storage capacitor 7. The other end of this member is connected through the emitter-collector path of a transistor 32 to the positive terminal of the source of voltage 15. The base of the transistor 32 is connected through a resistor 33 and capacitor 34 to the positive terminal of the storage capacitor 7.

Parallel to the series connection of the transistor 32 and time function member 30, 31, there is connected a unijunction transistor 35 having the base resistors 36 and 37. The control electrode of the unijunction transistor is connected to the junction point between the resistor 30 and capacitor 31 of the time function member. The base of the unijunction transistor 35 is connected through the base resistor 37 to the negative terminal of the storage capacitor, and is also connected with the gate or control electrode of the quenching thyristor 35, this connection being through a voltage amplifier circuit comprising the transistors 38 and 39.

It has been mentioned above that the phase control 3 is of known form. However, for the sake of completeness, further details thereof will be described in connection with FIG. 4. Between the input 3a of the phase control and the output 3b thereof, there is connected a triac 40 whose control electrode is connected with the control input 3d through a diac 41 and a resistor 42. The positive output of the triac 40 is connected with the control input 3c. The adjusting resistor 29 described above is connected to the control inputs 3c and 3d. Between the negative output of the triac 40 and the junction point between the diac 41 and resistor 42, there is connected a capacitor 43. Another capacitor 44 is connected between the negative output of the triac and the control input 3d.

Figure 2:
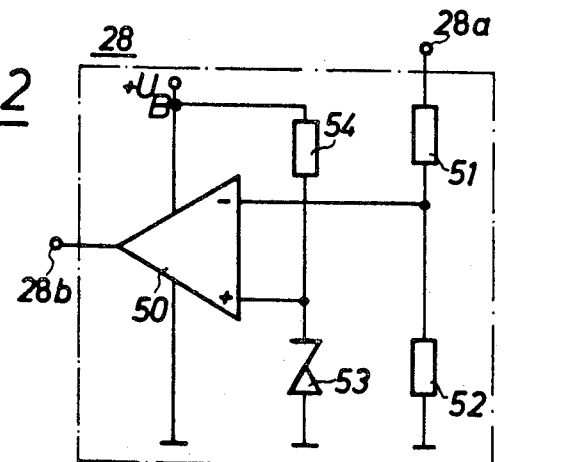
FIG. 2 is a schematic wiring diagram showing further details of a charge control switch indicated simply by the rectangle 28 in FIG. 1.

FIG. 2 illustrates further details of the charge control circuit 28 in the voltage transformer 8. An operational amplifier 50 serving as a comparator is connected to a source of voltage indicated schematically at $U_B$. Its output forms the output 28b of the charge control circuit 28 which is connected with the gate or control electrode of the triac 27. The inverted input of the operational amplifier 50 is connected to the intermediate tap of a voltage divider circuit comprising the resistors 51 and 52 in series with each other. This voltage divider circuit is located, as illustrated, between the input 28a of the charge control circuit, and the negative potential of the source of direct current voltage $U_B$. The input 28a of the charge control circuit is connected with the positive terminal of the storage capacitor 7, as illustrated in FIG. 1. The non-inverted input of the operational amplifier 50 is connected to a reference voltage which is formed by a Zener diode 53 which is connected through a resistor 54 to the operating voltage $U_B$ of the operational amplifier 50.

Figure 3:
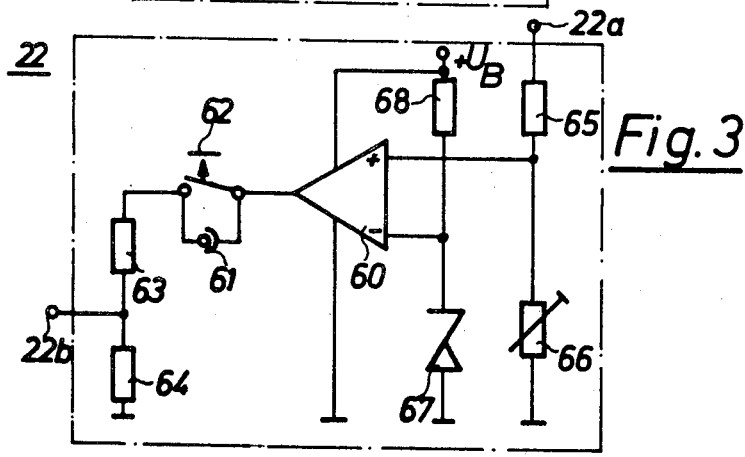
FIG. 3 is a wiring diagram illustrating further details of a blocking device indicated simply by the rectangle 22 in FIG. 1.

FIG. 3 shows further details of the blocking device 22, schematically shown merely by a rectangle in FIG. 1. This blocking device comprises an operational amplifier 60 serving as a comparator whose output is connected through switches 61 and 62 in parallel with each other, and through a voltage divider circuit comprising resistors 63 and 64, to the zero potential of the source of direct current voltage $U_B$ which supplies the operational amplifier. The switch 61 is the conventional synchronous contact switch of the camera with which this studio lighting system is used, and is arranged, in the conventional manner, to be closed in synchronism with the opening of the camera shutter. The switch 62 is a hand or manual switch to enable the flash to be triggered manually. The intermediate tap of the voltage divider 63, 64 is connected to the output 22b of the blocking device 22, this output being connected to the control electrode or gate of the thyristor 19, as illustrated in FIG. 1.

The non-inverting input of the operational amplifier 60 is connected to an intermediate tap of a voltage divider circuit comprising the resistor 65 and the adjustable resistor 66. This voltage divider circuit lies between the input 22a of the blocking device 22, and the zero potential of the source of voltage for the operational amplifier. The input 22a is connected with the positive plate of the storage capacitor 7, as illustrated in FIG. 1. A Zener diode 67 and a resistor 68 are connected between the zero potential and the positive potential of the source $U_B$, and this Zener diode supplies the reference voltage to the inverted input of the operational amplifier 60.

The operation of the studio lighting system described above is as follows:

When the switch 5 is turned on, the entire studio lighting system becomes ready for operation. First of all, the subject to be photographed is illuminated by means of the continuous focusing light 2. The photographer can then determine the desired positioning or setting of the subject, and the desired brightness of the continuous light can be adjusted by means of the adjustment resistor 29. The adjustment of the resistor 29 simultaneously adjusts the resistor 30, because of the mechanical connection between them, and the adjustment of the resistor 30 serves to adjust the time of the duration of the flash, terminating or quenching the flash at an earlier or later time as the case may be, depending on the adjustment. When the desired time is reached, the circuit gives off a pulse to the quenching thyristor 25 so as to terminate the flash. This period of time is so established that the quantity of light which is given off by the flash tube 10 upon the discharge of the storage capacitor 7 within this period of time, causes an exposure of the photograph which corresponds to the prior illumination of the object or subject being photographed by means of the focusing continuous light.

In the condition of readiness for operation, the storage capacitor 7 and the capacitors 18 and 20 are charged to the operating voltage, for instance 360 volts of direct current. This operating voltage is determined exactly by the charge control circuit 28. When the desired operating voltage of the storage capacitor 7 is reached, the control circuit 28 no longer gives off any firing pulses to the triac 27, as a result of which the triac blocks and the voltage transformer 8 becomes effectively disconnected. The quantity of light given off by the flash tube 10 can be proportional to the period of time set in the control circuit 4 only if the same predetermined voltage is always present in the capacitor 7 at the time of commencement of the flash, and that is why it is important to make sure that the storage capacitor is always charged to exactly the right voltage when a flash is to be produced; otherwise the results would not be consistent from one exposure to another exposure.

It is for this purpose of insuring that the right charge is carried by the storage capacitor when a flash is to be produced, that the firing device 12 is connected to the blocking device 22. This blocking device 22 only permits a pulse to arrive at the control electrode of the thyristor 19 upon the closing of the synchronous contact switch 61 or the manual switch 62, if a positive voltage is present at the output of the operational amplifier 60. However, this is only possible when the positive plate of the storage capacitor 7, connected with the non-inverted input of the operational amplifier 60, has a higher voltage than the inverted input of the operational amplifier.

When the predetermined charge voltage of the storage capacitor 7 is reached, then when the synchronous contact 61 or the manual switch 62 is closed, a positive pulse will pass to the control electrode of the thyristor 19, and this thyristor will thereby be triggered or fired, becoming conductive. The capacitors 18 and 20 now discharge through the thyristor 19 and the primary windings of the respective pulse transformers 16 and 21. A firing pulse if thus produced by the transformer 21 to the firing electrode of the flash tube 10, and a negative pulse if transmitted from the secondary winding of the transformer 16 to the base of the transistor 14, whereby the latter becomes conductive. When the transistor 14 is conductive, the control electrode of the switch thyristor 11 is connected to the source of direct current voltage 15, so that simultaneously with the firing of the flash tube 10, the switch thyristor 11 also becomes conductive.

The storage capacitor 7 now starts suddenly to discharge through the series connection of flash tube 10 and switch thyristor 11. The change in voltage at the storage capacitor 7 passes as a negative pulse to the base of the transistor 32, so that this transistor is driven or becomes conductive, and the control circuit is connected with the start of the flash discharge. The capacitor 31 of the control circuit is charged through the conductive transistor 32 and the resistor 33, until the voltage at the capacitor 31 exceeds the breakthrough voltage of the unijunction transistor 35. At this moment the unijunction transistor switches through, and there is a voltage drop in the resistor 37, which permits the NPN transistor 38 to become conductive whereby the PNP transistor 39 is in its turn driven, and a positive pulse passes from the source of voltage 15 to the control electrode of the quenching thyristor 25.

The quenching thyristor 25 thus becomes conductive, and the quenching capacitor 24 discharges through the quenching thyristor 25 and the resistor 23, whereby a negative voltage occurs at the anode-cathode path of the switch thyristor 11, so that the latter blocks in known manner. In order to accelerate the disconnecting process of the switch thyristor 11, its control electrode is connected furthermore, through a resistor 70, with the negative pole of another source of direct current voltage 71, for instance, five volts.

With the blocking of the switch thyristor 11, the discharge of the storage capacitor 7 over the flash tube 10 is interrupted and the flash is extinguished or terminated. Since no change in voltage occurs anymore at the storage capacitor 7, there is also no longer any negative control voltage at the base of the transistor 32, so the latter blocks and the control circuit 4 is disconnected. The taking of the picture has been completed. When the next photograph is taken, the process just described is repeated.

What is claimed is:
1. Studio lighting system comprising:
    a. means for producing a continuous light for illuminating an object to be photographed before making a photographic exposure;
    b. electronic flash means including a flash tube for illuminating said object during said exposure;
    c. means for adjusting the intensity of said continuous light;
    d. an electronic switch for interrupting a flash from said flash tube;
    e. control circuit means for operating said electronic switch to interrupt a flash at an adjustable time after commencement thereof;
    f. said control circuit means including time function means for determining said adjustable time at which said flash is interrupted; and
    g. means for operatively connecting said time function means to said means for adjusting the intensity of said continuous light in such manner that the time of interrupting the flash is directly dependent upon the adjusted intensity of said continuous light before the photographic exposure is made.
2. The invention of claim 1, wherein said means for adjusting the intensity of the continuous light includes a regulating member (29), and said time function means in said control circuit means includes a time adjuster (30), and said time adjuster is connected to said regulating member.
3. The invention of claim 1, wherein said means for adjusting the intensity of the continuous light includes a potentiometer (29) having a movable wiper, and said control circuit means includes a series connection of a capacitor (31) and an adjustable resistor (30) having a displaceable tap, and a mechanical connection between said wiper and said tap so that they move together.
4. The invention of claim 1, further comprising:
    h. a chargeable storage capacitor (7) connected to be discharged through said flash tube (10);
    i. means (28) for interrupting charging of said storage capacitor when a predetermined desired value of capacitor voltage is reached during charging thereof; and
    j. means (22) for blocking firing of said flash tube when said storage capacitor is charged to a voltage less than said desired value.

5. The invention of claim 1, further comprising a chargeable storage capacitor (7) connected to be discharged through said flash tube (1), means including a voltage transformer for charging said storage capacitor, a source of reference voltage to determine the desired value of capacitor voltage to which said storage capacitor is to be charged, a triac (27) for controlling operation of said charging means, a comparator (50) having two inputs and one output, a circuit from said positive plate of said storage capacitor to one input of said comparator, a circuit from said source of reference voltage to the other input of said comparator, and a circuit from the output of said comparator to a control electrode of said triac.

6. The invention of claim 1, wherein said electronic switch comprises a thyristor (11), and firing means (12) for causing concomitant firing of said flash tube (10) and said thyristor (11).

7. The invention of claim 6, further comprising a PNP transistor (14), a first pulse transformer (16) having a secondary winding connected in parallel with the emitterbase path of said PNP transistor, a control circuit through the emitter-collector path of said PNP transistor (14) to a control electrode of said electronic switch (11), and a second pulse transformer (21) having a secondary winding connected to a cathode of said flash tube (10) and to a firing electrode thereof, said firing means (12) comprising a first firing capacitor (18) in series with a primary winding of said first pulse transformer (16), a second firing capacitor (20) in series with a primary winding of said second pulse transformer (21), and another thyristor (19) having an anodecathode path in parallel both with the series circuit of said first pulse transformer and first firing capacitor and with the series circuit of said second pulse to transformer and second firing capacitor, so that when said other transistor is conductive, said first and second firing capacitors may discharge through the primary windings of said first and second pulse transformers, respectively, to create pulses in the respective secondary windings thereof.

8. The invention of claim 7, further comprising a chargeable storage capacitor (7) having a positive plate, a source of reference voltage to determine the desired value of capacitor voltage to which said storage capacitor is to be charged, a comparator (60) having two inputs and one output, switch means (61, 62) for initiating a flash, a circuit from said positive plate of said storage capacitor to one input of said comparator, a circuit from said source of reference voltage to the other input of said comparator, and a circuit from the output of said comparator through said switch means for initiating a flash to a control electrode of said other thyristor (19).

9. The invention of claim 1, wherein said electronic switch comprises a thyristor (11) connected in series with said flash tube (10) and arranged to be triggered upon firing said flash tube, and quenching means controlled by said control circuit means for rendering said thyristor nonconducting.

10. The invention of claim 9, further comprising a second electronic switch (32), and a pulse generator, and wherein said time function means in said control circuit means is connected through said second electronic switch to said pulse generator, and said pulse generator has an output connected to said quenching means.

11. The invention of claim 10, wherein said second electronic switch (32) is a PNP transistor, further comprising a source of positive direct current reference voltage (15), a circuit connecting the emitter of said transistor to said source of positive reference voltage, a circuit connecting the collector of said transistor to said time function means, a capacitor (34), and a circuit connecting the base of said transistor through said capacitor (34) to the anode of said flash tube (10).

12. The invention of claim 9, further comprising a third electronic switch (14), a fourth electronic switch (25), a first source of positive direct current reference voltage (15), a second source of negative direct current reference voltage (71), said thyristor (11) having a control electrode, a circuit connecting said control electrode of said thyristor through said third switch to said first source of reference voltage, a circuit connecting said control electrode to said second source of reference voltage, a chargeable quenching capacitor (24), a circuit connecting said quenching capacitor and said fourth switch in series with each other and in parallel with the anode-cathode path of said thyristor (11), and means for closing said third switch upon initiation of a flash in said flash tube (10).

13. The invention of claim 12, wherein said fourth switch (25) is a thyristor having a control electrode, further comprising a pulse generator, an amplifier (38, 39), and a circuit connecting said control electrode of said fourth switch through said amplifier to said pulse generator.

* * * * *